United States Patent [19]

Uramoto et al.

[11] Patent Number: 5,204,962
[45] Date of Patent: Apr. 20, 1993

[54] PROCESSOR WITH PRECEDING OPERATION CIRCUIT CONNECTED TO OUTPUT OF DATA REGISTER

[75] Inventors: Shinichi Uramoto; Hideyuki Terane, both of Hyogo, Japan

[73] Assignee: Mitsubishi Denki Kabushiki Kaisha, Tokyo, Japan

[21] Appl. No.: 888,329

[22] Filed: May 26, 1992

Related U.S. Application Data

[63] Continuation of Ser. No. 618,285, Nov. 28, 1990, abandoned.

[30] Foreign Application Priority Data

Nov. 30, 1989 [JP] Japan .................................. 1-313864
Dec. 4, 1989 [JP] Japan .................................. 1-316022
Jul. 16, 1990 [JP] Japan .................................. 2-188494

[51] Int. Cl.$^5$ ............................................. G06F 7/00
[52] U.S. Cl. .................................... 395/725; 395/775; 395/800; 364/736
[58] Field of Search .................. 364/DIG. 1, DIG. 2, 364/736; 395/775, 725, 800

[56] References Cited

U.S. PATENT DOCUMENTS

| | | | |
|---|---|---|---|
| 4,310,879 | 1/1982 | Pendeya | 364/200 |
| 4,488,255 | 12/1984 | Krisher et al. | 364/900 |
| 4,533,992 | 8/1985 | Magar et al. | 364/200 |
| 4,598,358 | 7/1986 | Boddie et al. | 364/200 |
| 4,627,021 | 12/1986 | Persoon et al. | 364/900 |
| 4,633,386 | 12/1986 | Terepin | 364/200 |
| 4,689,738 | 8/1987 | van Wijk et al. | 364/200 |
| 4,694,416 | 9/1987 | Wheeler et al. | 364/200 |
| 4,791,590 | 12/1988 | Ku et al. | 364/736 |
| 4,794,517 | 12/1988 | Jones et al. | 364/200 |
| 4,901,267 | 2/1990 | Birman et al. | 364/736 |
| 4,926,355 | 5/1990 | Boreland | 395/725 |
| 5,053,987 | 10/1991 | Genusov et al. | 364/736 |
| 5,068,819 | 11/1991 | Misra et al. | 364/736 |

FOREIGN PATENT DOCUMENTS 59123969 12/1982 Japan.
62-33239 2/1987 Japan.

OTHER PUBLICATIONS

"A Fast Computational Algorithm for the Discrete Cosine Transform" by Chen, Smith and Fralick, IEEE Transactions on Communications, vol. COM-25, No. 9, Sep. 1977.
MC6800, 16-Bit Microprocessor User's Manual, Motorola, Inc., Second Edition, Jan. 1980.
"A Digital Processor for Decoding Composite TV Signals Using Adaptive Filtering" by Murakami Nakagawa, Yoshimoto, Akasaka, Nakahima and Horiba, IEEE Journal of Solid-State Circuits, vol. SC-21, No. 5, Oct. 1986.
"A 50ns Video Signal Processor", Nakagawa, Terane, Matsumura, Segawa, Yoshimoto, Shinohara, Kato, Maeda, and Horiba, IEEE International Solid-State Circuits Conference, 1989.

Primary Examiner—Robert L. Richardson
Attorney, Agent, or Firm—Lowe, Price, LeBlanc & Becker

[57] ABSTRACT

A microprocessor with an improved register part is disclosed. The register part includes a plurality of registers for holding data and adding circuits connected to the outputs of predetermined two registers. Adding circuits are provided as a preceding operation circuit and a part of the operation to be executed in an ALU or a multiplier is carried out in the preceding operation circuit. At the time two data to be used in an operation are applied to the predetermined two registers, addition is started in the preceding operation circuit. Therefore, the number of instructions required for carrying out the operation is reduced thereby realizing faster processing.

29 Claims, 13 Drawing Sheets

FIG. 2
| STEP | OPERATION | RESULT |
|---|---|---|
| 1 | $a_1 (M_1)$ * $a_2 (M_2)$ | → $b_1 (R_1)$ |
| 2 | $a_3 (M_3)$ * $a_4 (M_4)$ | → $b_2 (R_2)$ |
| 3 | $a_5 (M_5)$ * $a_6 (M_6)$ | → $b_3 (R_3)$ |
| 4 | $a_7 (M_7)$ * $a_8 (M_8)$ | → $b_4 (R_4)$ |
| 5 | $AR_{12}$ * $AR_{34}$ | → $X (R_5)$ |
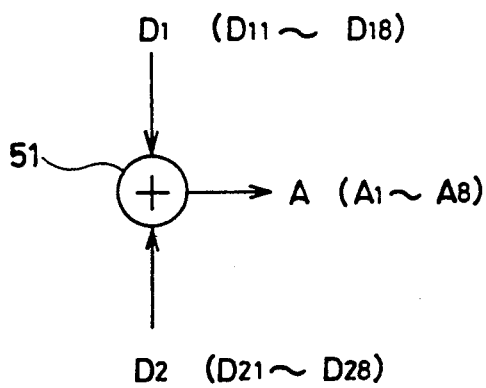
FIG. 3
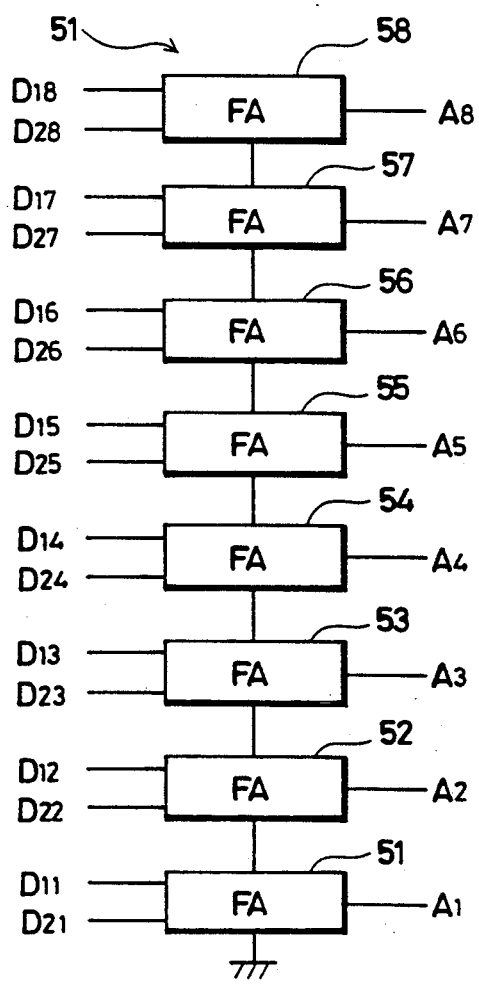
FIG. 4

| STEP | OPERATION | RESULT |
| --- | --- | --- |
| 1 | a1 (M1) + a2 (M2) ⟶ | b1 (R1) |
| 2 | a3 (M3) + a4 (M4) ⟶ | b2 (R2) |
| 3 | b2 (R2) + a5 (M5) ⟶ | b3 (R3) |
| 4 | b3 (R3) + a6 (M6) ⟶ | b4 (R4) |
| 5 | b4 (R4) + a7 (M7) ⟶ | b5 (R5) |
| 6 | DADD (M8) + b5 (R5) ⟶ | x (R5) |

FIG.19

| STEP | OPERATION | RESULT |
|------|-----------|--------|
| 1 | $AR_{14} + AR_{32}$ | $a_3\ (R_5)$ |
| 2 | $AR_{14} - AR_{32}$ | $a_4\ (R_7)$ |
| 3 | $a_3(R_5) \times 0.717$ | $Z_0\ (R_5)$ |
| 4 | $a_4(R_7) \times 0.717$ | $Z_2\ (R_7)$ |
| 5 | $SR_{14} \times 0.924$ | $a_7\ (R_6)$ |
| 6 | $SR_{32} \times 0.383$ | $a_8\ (R_8)$ |
| 7 | $a_7(R_6) - a_8(R_8)$ | $Z_1\ (R_6)$ |
| 8 | $SR_{14} \times 0.383$ | $a_9\ (R_3)$ |
| 9 | $SR_{32} \times 0.924$ | $a_{10}\ (R_4)$ |
| 10 | $a_9(R_3) + a_{10}(R_4)$ | $Z_3\ (R_8)$ |

| STEP | OPERATION | RESULT |
|------|-----------|--------|
| 1 | $a_1$ ($M_1$) + $a_2$ ($M_2$) → | $b_1$ ($R_1$) |
| 2 | $b_1$ ($R_1$) + $a_3$ ($M_3$) → | $b_2$ ($R_2$) |
| 3 | $b_2$ ($R_2$) + $a_4$ ($M_4$) → | $b_3$ ($R_3$) |
| 4 | $b_3$ ($R_3$) + $a_5$ ($M_5$) → | $b_4$ ($R_4$) |
| 5 | $b_4$ ($R_4$) + $a_6$ ($M_6$) → | $b_5$ ($R_5$) |
| 6 | $b_5$ ($R_5$) + $a_7$ ($M_7$) → | $b_6$ ($R_6$) |
| 7 | $b_6$ ($R_6$) + $a_8$ ($M_8$) → | X ($R_7$) |

| STEP | OPERATION | RESULT |
|---|---|---|
| 1 | x0 (R1) + x3 (R4) | a1 (R6) |
| 2 | x1 (R2) + x2 (R3) | a2 (R7) |
| 3 | a1 (R6) + a2 (R7) | a3 (R5) |
| 4 | a1 (R6) − a2 (R7) | a4 (R7) |
| 5 | a3 (R5) × 0.717 | Z0 (R5) |
| 6 | a4 (R7) × 0.717 | Z2 (R7) |
| 7 | x0 (R1) − x3 (R4) | a5 (R1) |
| 8 | x2 (R3) − x1 (R2) | a6 (R2) |
| 9 | a5 (R1) × 0.924 | a7 (R3) |
| 10 | a6 (R2) × 0.383 | a8 (R4) |
| 11 | a7 (R3) − a8 (R4) | Z1 (R6) |
| 12 | a5 (R1) × 0.383 | a9 (R3) |
| 13 | a6 (R4) × 0.924 | a10 (R4) |
| 14 | a9 (R3) + a10 (R4) | Z3 (R8) |

PROCESSOR WITH PRECEDING OPERATION CIRCUIT CONNECTED TO OUTPUT OF DATA REGISTER

This application is a continuation of application Ser. No. 07/618,285 filed Nov. 28, 1990 and now abandoned.

BACKGROUND OF THE INVENTION

1. Field of the Invention

The invention generally relates to a processor, and particularly to a processor with a preceding operation circuit connected to the output of a data register. The invention has particular applicability to a microprocessor performing butterfly operation at high speed.

2. Description of the Background Art

As computer systems and microcomputers etc. have been increasingly used in various fields of society, demand has increased for high speed operational processing using the same. Generally, operations in a computer system or a microcomputer are carried out by a processor or a microprocessor which is a logic integrated circuit. Therefore, various efforts have been made in order to make these processors operate faster.

FIG. 20 is a block diagram showing a conventional microprocessor. The kind of processor shown in FIG. 20 is observed, for example in an article by Nakagawa et al titled "A 50ns Video Signal Processor" (ISSCC89, Digest of Technical Papers pp. 168-169). In this article this microprocessor is described as a digital signal processor (DSP).

Referring to FIG. 20, this microprocessor comprises a data operating part 1 for carrying out various operations, a bus line 2 for transmitting data, a data memory part 24 for storing data, an instruction memory part 23 for storing instruction programs to carry out operations, a program sequence control part 22 for receiving externally applied control signals and decoding instruction programs, an address operating part 8 for operating addresses, and an interface part 21 for externally inputting and outputting data. Data operating part 1 comprises an arithmetic logic unit 3 (referred to as ALU hereinafter) to carry out logic operations of data applied through bus line 2, a multiplier 5 to multiply data applied through bus line 2, and a register part 4 to hold output data from ALU 3 and multiplier 5 temporarily.

In operation, program sequence control part 22 decodes an instruction program stored in instruction memory part 23, and applies controlling signals S10 and S20 to data operating part 1, address operating part 8, data memory a part 24 and interface part 21. Address operating part 8 obtains by operations the source address of data to be processed in data operating part 1 as well as the destination address of the processed data in response to the controlling signal S10. The source address and the destination address output from address operating part 8 are transmitted to each part through bus line 2. Data memory part 24 supplies data designated by an address output from address operating part 8 to data operating part 1 through bus line 2. In data operating part 1, ALU 3 and multiplier 5 carry out operation of the applied data, and apply the result of the operation to register part 4. Register part 4 temporarily holds the applied data, and outputs the held data to bus line 2 in response to source designation signals S1 to Sn applied through bus line 2 from address operating part 8. The data applied to bus line 2 is transmitted through bus line 2 to a part designated by address operating part 8, e.g. data memory part 24 or interface part 21. After the processed data is applied to interface part 21 through bus line 2, the data is stored in, for example, an externally provided external storage device.

FIG. 21 is a schematic block diagram of register part 4 indicated in FIG. 20. Referring to FIG. 21, register part 4 comprises n registers R1 to Rn. The respective registers R1 to Rn, as indicated in FIG. 20, are assumed to be connected to receive processed data from ALU 3 and multiplier 5 (not shown). In addition, the respective registers R1 to Rn are connected to receive the source designation signals S1 to Sn respectively from address operating part 8 through bus line 2 (not shown). Data memory part 24 is connected to receive address signals AD from address operating part 8. It is assumed that data a1 to a8 to be operated are stored in each of the addresses M1 to M8 in data memory part 24.

In operation, for example, data b1 operated in ALU 3 or multiplier 5 is held in register R1. Address operating part 8 outputs the source designation signal S1. Register R1 is responsive to the signal S1 to supply the data b1 held therein to data bus line 2. Likewise, data memory part 24 supplies the data a1 designated by the address signal AD output from address operating part 8. The data supplied to data bus 2 is then applied to data operating part 1 thereby continuing the operations.

Generally, in a microprocessor, an addressing method (addressing) is used to designate the storing locations of source data. As addressing methods, direct addressing, indirect addressing, relative addressing immediate addressing, offset addressing and indexed addressing are known.

For example, according to the direct addressing, the data of address defined in the operand part of an instruction is designated as source data. In case of the indirect addressing, the storing location of source data is written in a register or a data memory designated in the operand part of an instruction and the source data is taken out therefrom. According to the relative addressing, for example, the value of the program counter in which the address of the instruction presently under execution is held, with some value added, is to be the value of the address of the source data. According to the immediate addressing data, the source data is directly written into the operand part of an instruction. According to the offset addressing or the indexed addressing, the value of the address in which source data is stored is "qualified". Generally, these address methods are widely known by other articles.

The above mentioned address methods are the methods to select either of the designation of the register in which source data is stored, the designation of the address of the data memory in which source data is stored, and the use of the immediate data directly written in the operand part of an instruction. In other words, the data treated as source data in data operating part 1, is either the immediate data written in the operand part of the instruction or the data held in the register or the data stored in the data memory.

FIG. 23 is a diagram of operational signs indicative of butterfly operation in discrete Fourier transform by frequency domain dividing method. As understood from FIG. 23, butterfly operation allows output data X and Y represented by the following equations to be obtained from two input data a and b.

$$X = a + b \tag{1}$$

$$Y = (a-b) \times W_N \qquad (2)$$

where, $W_N$ is a coefficient called "twist factor".

In fast Fourier transform (FFT), operational stages including N/2 butterfly operations (N is the number of sampling and the power of 2) are connected in series over $\log_2 N$ stages. Also in the foregoing DCT algorithm, the butterfly operations of $\log_2 N$ stages are performed.

As understood from FIG. 23 and the equations (1) and (2), it is pointed out a that in order to carry out butterfly operation, addition, subtraction and multiplication are needed to be performed once respectively.

On the other hand, discrete cosine transform (referred to as DCT hereinafter) which is known as a kind of orthogonal transform, generally has a good transform characteristic of video data having strong correlation to each other and, therefore, it is used for compression of video data. As another reason why DCT is used for compression of video data, it is pointed out that there exists a fast algorithm. Many fast algorithms have been presented until today and one example is in an article by W. H. Chen et al, titled "A Fast Computational Algorithm for the Discrete Cosine Transform" (IEEE Transactions on Communications VOL. COM. 25, No. 9, September, 1977). In most fast algorithms, basically butterfly operation indicated in FIG. 23 is included.

In accordance with the foregoing article by Chen et al, the transformation equation of discrete function with the sampling values of N point f (j), where j=0, 1, ... , N-1 is described as follows;

$$F(k) = 2 \cdot c(k)/N \cdot \sum_{j=0}^{N-1} f(j) \cdot \cos\{(2j+1) k \pi/2N\} \qquad (3)$$

$$k = 0, 1, \ldots, N - 1$$
where,
$$c(k) = 1/\sqrt{2} \quad \text{(if } k = 0\text{)} \qquad (4)$$
$$= 1 \quad \text{(if } k \geq 1\text{)} \qquad (5)$$

Accordingly, in case the discrete function f (j) having a sampling value of four points the following equation (6) is obtained by substituting N=4 in equation (3).

$$F(k) = 2 \cdot c(k)/8 \cdot \sum_{j=0}^{3} f(j) \cdot \cos\{(2j+1) k \pi/8\} \qquad (6)$$

$$k = 0, 1, 2, 3$$

In a conventional microprocessor, the designation of source data is performed as mentioned above and the time required for the processing is mainly determined by the number of necessary operations and the operating speed in data operating part 1. That is, the operating speed of the microprocessor is restricted by the processing speed in data operating part 1.

In order to realize faster operational processing, various methods are employed, such as a method to shorten the period of one instruction cycle (to increase the clock frequency) and a method to carry out a sophisticated operation in response to one instruction (for example multiplication, division and rational function operation etc.) by providing arithmetic units in parallel like a floating point arithmetic apparatus. However, according to the former method, the fast operation is impaired by problems related to semiconductor manufacturing technique and limitation in performance of the peripheral devices. Meanwhile, the latter method is not desirable because a large number of devices are required, for carrying out operations and in addition to that, it is considerably complicated to control the input and the output. As is often the case with numeric operation, simple operations such as addition and subtraction are repeated many times. In such a case, the latter method making use of the floating point arithmetic apparatus is not suitable because the circuits to carry out complicated operations come to be wasted.

Next, as a simple example of numeric operation, description will be given on the case in which summing of eight data a1 to a8 is carried out.

$$X = a1 + a2 + a3 + \ldots + a8 \qquad (7)$$

The respective data a1 to a8 are supposed to be stored in addresses M1 to M8 in data memory part 24, respectively, and data X indicative of the result is assumed to be stored in register R7.

FIG. 22 is an operational flow chart showing how summing of the eight data represented by equation (7) is carried out using register part 4 indicated in FIG. 21. In this figure, for example a1 (M1)+a2 (M2)→b1 (R1) indicates that data a1 stored in address M1 and data a2 stored in address M2 in data memory part 24 are added up and the added data b1 is stored in register R1.

In the arithmetic operation, as indicated in FIG. 22, addition is carried out over 7 operational steps, and the added data X is obtained in register R7. Accordingly, in order to carry out addition of eight data a1 to a8 using register parts 4 with the circuit configuration indicated in FIG. 21, the operation time corresponding to seven instruction cycles is required thereby preventing the operation time from being shortened.

Now, description will be given on the time required for operation in case of 4-point discrete cosine transform when register 4 indicated in FIG. 21 is used.

FIG. 24 is an operational flow chart of the case in which butterfly operation is carried out using register part 4 indicted in FIG. 21. In this figure, for example, x0 (R1)+x3 (R4)→a1 (R6) in step 1 indicates that data x0 held in register R1 and data x3 held in register R4 are added up and then the added data a1 is stored in register R6. Here, the respective input data x0 to x3 are supposed to be held in advance in registers R1 to R4, respectively.

In the arithmetic operation, as indicated in FIG. 24, operations are carried out over 14 arithmetic steps altogether. The operations include addition, subtraction and multiplication, and these operations are performed in ALU 3 or multiplier 5 in data operating part 1 indicated in FIG. 20. After the operations over 14 steps are carried out, the respective output data z0 to z3 indicative of the results of the operations are held in registers R5 to R8, respectively. Consequently, in order to carry out the butterfly operations using register part 4 with the circuit configuration indicated in FIG. 21, it is pointed out that the operation time corresponding to the total 14 instruction cycles is required, thus preventing the operation time from being reduced.

SUMMARY OF THE INVENTION

One object of the invention is to shorten time required for operation in a processor.

Another object of the invention is to increase the processing speed in a processor.

Another object of the invention is to reduce the number of instruction cycles for operation in a processor.

Yet another object of the invention is to carry out operations including addition and subtraction of two data at high speed in a processor.

A further object of the invention is to carry out butterfly operations at higher speed in a processor.

Briefly stated, the processor in accordance with the present invention comprises a control signal generation circuit for generating a control signal to control the designation and execution of a desired operation, a first operating circuit for carrying out the operation designated by the control signal, data bus lines for transmitting data used by the first operating circuit, a holding circuit for holding data used by the first operating circuit, and a second operating circuit connected to the output of the holding circuit for carrying out a predetermined operation.

In operation, when an operation is performed in the first operating circuit, data used for the operation is held in the holding circuit. Since the second operating circuit is connected to the output of the holding circuit, at the time when data is held in the holding circuit, the execution of the predetermined operation of the held data is initiated simultaneously. The second operating circuit is responsive to the control signal from the control signal generating circuit to supply the result of the operation to the data bus lines. Thus, the supply of data to the holding circuit and the predetermined operation are carried out simultaneously by the second operating circuit, thereby shortening the time required for the operation.

A processor in accordance with the present invention, in one aspect, comprises a control signal generating circuit for generating a control signal to control the designation and execution of a desired operation, a first operating circuit for carrying out the operation designated by the control signal, data bus lines for transmitting data used by the first operating circuit, a holding circuit for holding the first data used for the operation by the first operating circuit, a data storage circuit for storing second data used for the operation by the first operating circuit, and a second operating circuit connected to the output of the holding circuit and the output of the data storage circuit for carrying out a predetermined operation.

In operation, the first and second data used in the first operating circuit are held and stored in the holding circuit and the data storage circuit respectively. Since the second operating circuit is connected to the output of the holding circuit and the output of the data storage circuit, at the time when the data is read out from the data storage circuit, the execution of the predetermined operation is initiated by the second operating circuit on the held data and the data read out from the data storage circuit. The second operating circuit is responsive to the control signal from the control signal generating circuit to supply the result of the operation to the data bus lines. Thus, as the data is read out from the data storage circuit simultaneously with the execution of the predetermined operation by the second operating circuit, the time required for the operation is shortened.

A processor in accordance with the present invention, in another aspect, comprises data bus lines for transmitting operation data, an operating circuit for operating the operation data applied from the data bus lines, at least first and second holding circuits for holding the output data from the operating circuit, an adding circuit connected to the first and second holding circuits for adding data held in the first and second holding circuits, and subtracting circuit connected to the first and second holding circuits for subtracting data held in the first and second holding circuits.

In operation, the execution of the operations by the respective adding circuit and subtracting circuit are initiated at the same time when the output data output from the operating circuit are held in the first and second holding circuits. Accordingly, addition and subtraction conventionally performed by the operation circuit is performed by the adding circuit and the subtracting circuit provided separately from the operating circuit thereby reducing the operating time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an operational flow chart showing the case in which addition of eight data is carried out by the register part indicated in FIG. 1.

FIG. 3 is a schematic diagram representing the relation between the input and output data of the adding circuit indicated in FIG. 1.

FIG. 4 is a block diagram showing one example of the adding circuit indicated in FIG. 1.

FIG. 19 is an operational flow chart of butterfly operation by the register part indicated in FIG. 18.

DESCRIPTION OF THE PREFERRED EMBODIMENTS

Figure 1:
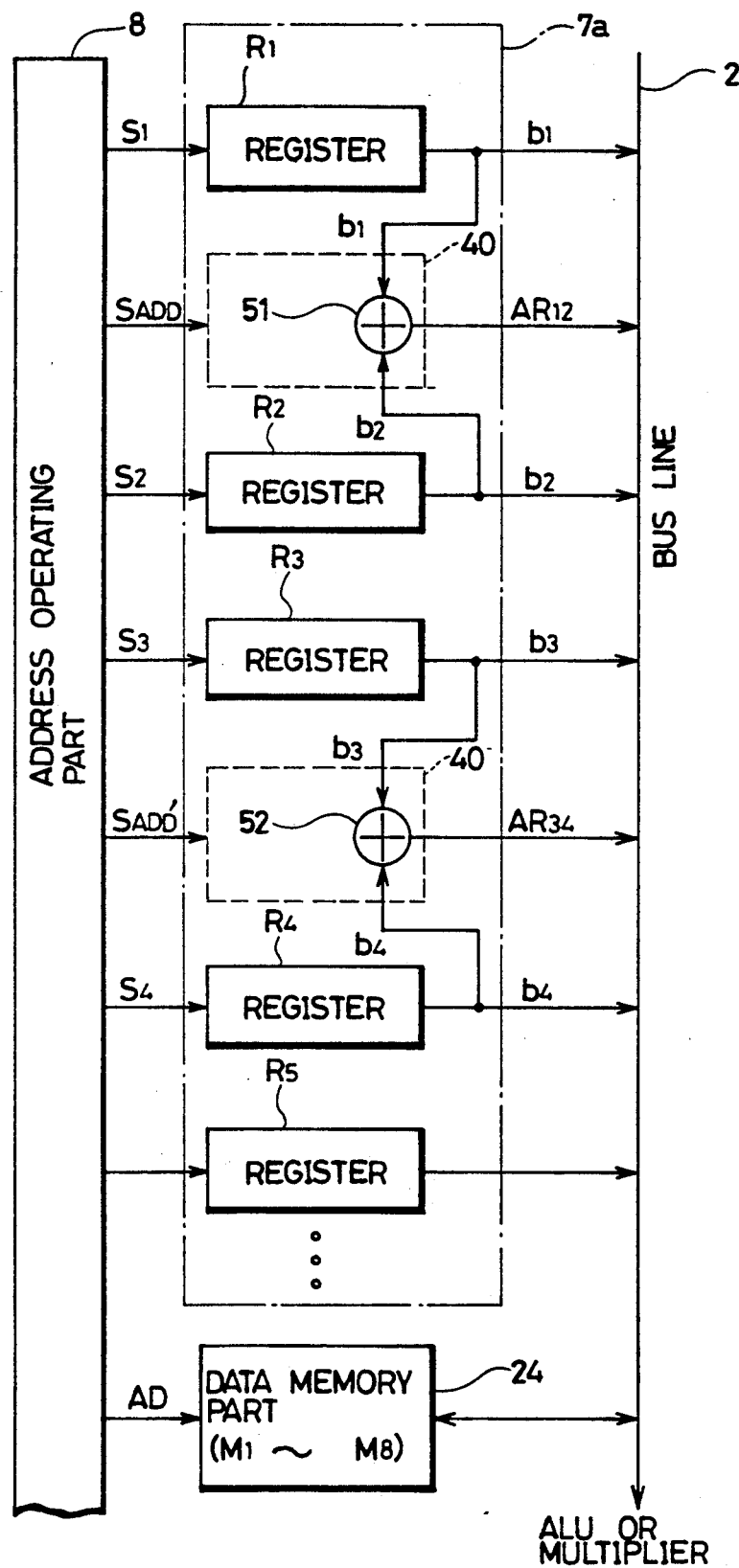
FIG. 1 is a schematic block diagram of a register part indicative of one embodiment in accordance with the present invention.
Figure 20:
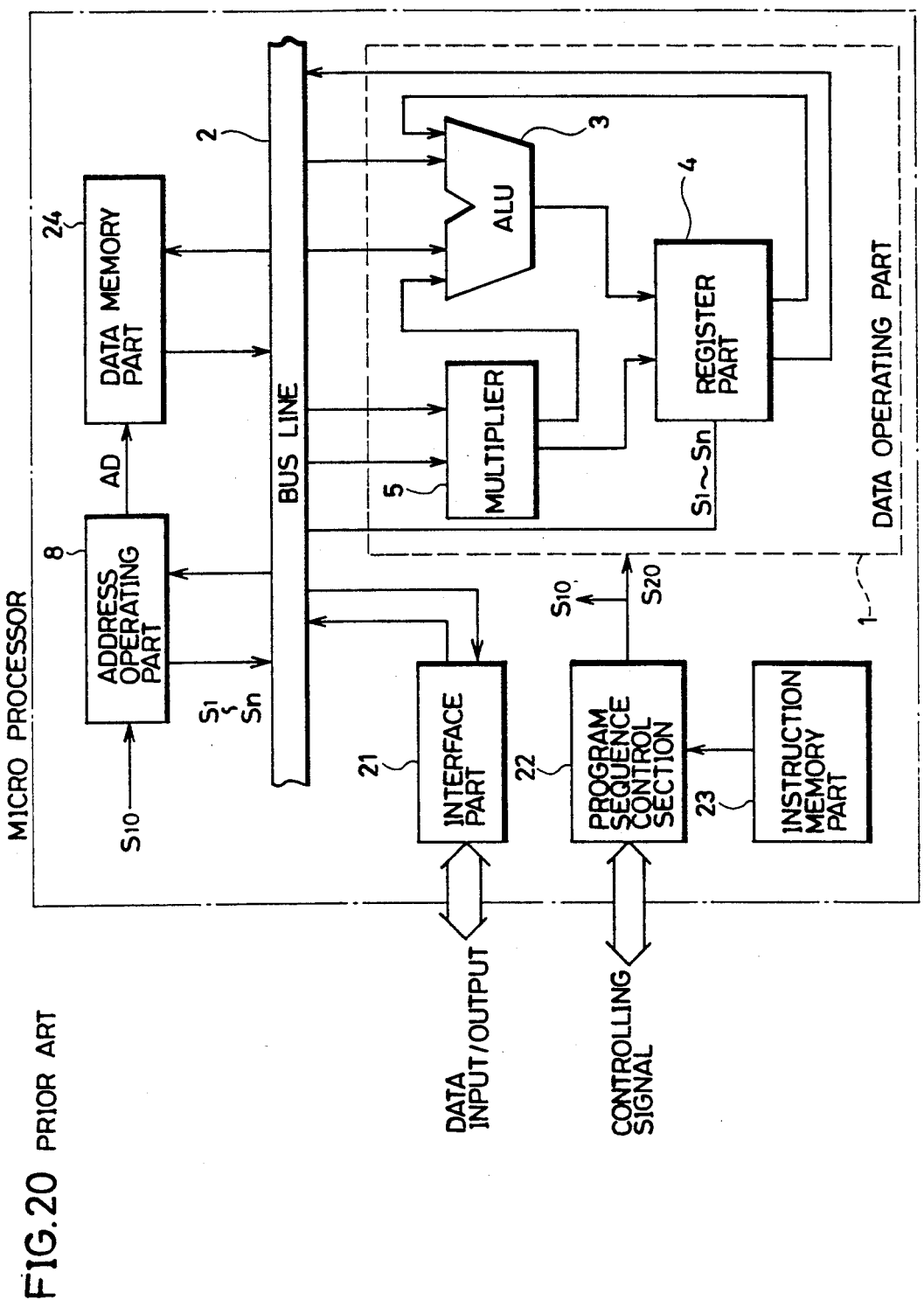
FIG. 20 is a block diagram of a conventional microprocessor.

With reference to FIG. 1, a register part 7a is employed in a microprocessor in place of the register part 4 indicated in FIG. 20. Register part 7a comprises 5 registers R1 to R5 required for carrying out addition of 8 data, which will be explained in the following. Register part 7a further comprises an adding circuit 51 connected to the outputs of registers R1 and R2, and an adding circuit 52 connected to the outputs of registers R3 and R4. Adding circuits 51 and 52 are provided as a preceding operation circuit 4 separately from ALU 3 and multiplier 5 in data operating part 1 indicated in FIG. 20. An address operating part 8 outputs source designation signals $S_{ADD}$ and $S_{ADD}$, which require the result of the addition. Each preceding operation circuit 40 is responsive to the signals $S_{ADD}$ and $S_{ADD}$, to supply data AR12 and AR34 indicative of the result of the addition to a bus line 2. Each of the registers R1 to R5 is connected to receive data indicative of the result of the operation from ALU 3 and multiplier 5 indicated in FIG. 20 (not shown).

FIG. 2 is an operational flow chart showing the case in which addition of 8 data is carried out using register part 7a indicated in FIG. 1. With reference to FIG. 2, the operation represented by the foregoing equation (7) is carried out using register part 7a indicated in FIG. 1. First, in step 1, data a1 stored in address M1 and data a2 stored in address M2 in data memory part 24 are added up by ALU 3 and then the added data b1 is held in the register R1. Likewise, in each of the steps 2, 3 and 4, pairs of data a3 and a4, a5 and a6, and a7 and a8 stored in data memory part 24 are added up, respectively, and then the added data b2, b3 and b4 are held in registers R2, R3, and R4, respectively. At the time when each of the added data b1 to b4 is held in the respective registers R1 to R4, preceding operation circuit 40 starts operating. That is, adding circuit 51 connected to the outputs of registers R1 and R2 carries out addition of data b1 and b2. Meanwhile, adding circuit 52 connected to the output of registers R3 and R4 carries out addition of data b3 and b4. Accordingly, in step 5, source designation signals $S_{ADD}$ and $S_{ADD}$, requiring the result of the addition are applied to preceding operation circuit 40 from address operating part 8 and preceding operation circuit 40 is responsive to the signals $S_{ADD}$ and $S_{ADD}$, to supply the added data AR12, and AR34 to bus line 2. AR12 and AR34 supplied to bus line 2 are added in ALU 3 and then data X indicative of the result of the addition is held in register R5. (step 5).

Figures 21, 22:
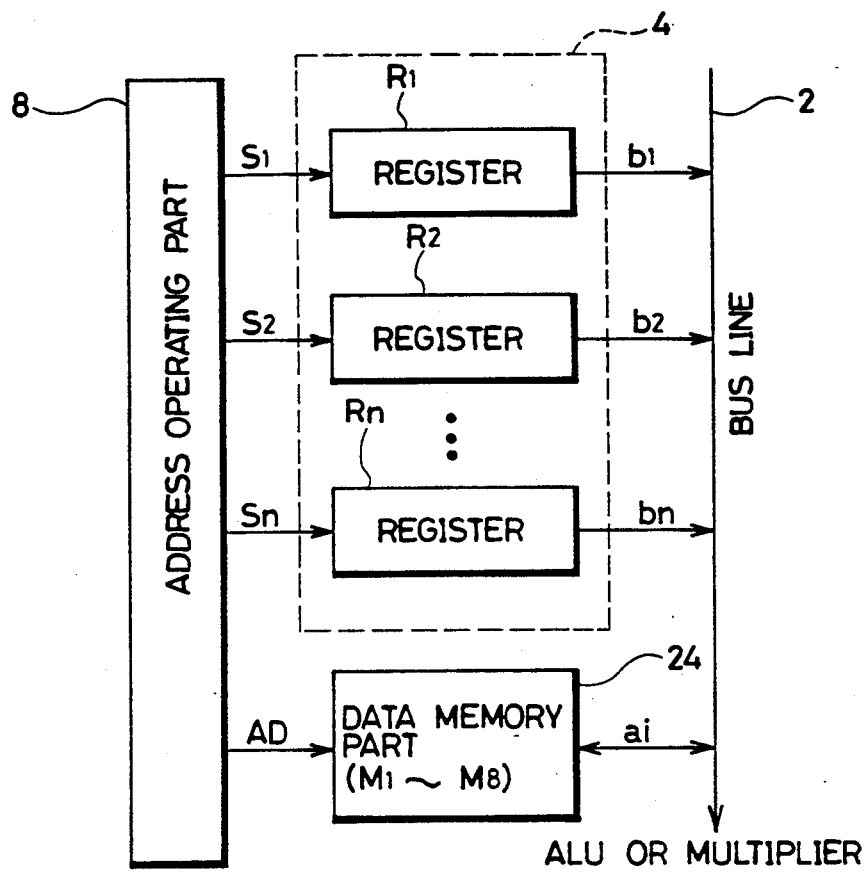
FIG. 21 is a schematic block diagram of the register part indicated in FIG. 20.
FIG. 22 is an operational flow chart showing the case in which 8 data are added up by the register part indicated in FIG. 21.

In comparison with the conventional operational flow chart indicated in FIG. 22, it is pointed out that in the case where addition of 8 data is carried out using register part 7a indicated in FIG. 1, two operational steps are omitted. That is, as addition of 8 data a1 to a8 are carried out over the time corresponding to five instruction cycles, the operation time is shortened thereby realizing the faster operation as a result. In other words, as the number of instructions required for carrying out operation is reduced, the time required for the operation is to be reduced. Generally speaking, in arithmetic operation, since it is often the case that addition is repeated many times, reduction of instruction steps contributes a lot to make the processing faster.

FIG. 3 is a schematic diagram showing the relation between the input and output data of adding circuit 51 indicated in FIG. 1. With reference to FIG. 3, adding circuit 51 receives data D1 composed of data bits D11 to D18 and data D2 composed of data bits D21 to D28. As the result of the addition, the added data A formed of data bits A1 to A8 is output. Adding circuits 51 and 52 indicated in FIG. 21 thus perform operation of data formed of a plurality of data bits.

FIG. 4 is a block diagram showing an example of adding circuit 51 indicated in FIG. 1. With reference to FIG. 4, adding circuit 51 comprises 8 full adders (FA) 51 to 58, each connected to receive the data bits of data D1 and D2. Data bits A1 to A8 composing the added data A are output respectively from the respective full adders 51 to 58. The adjacent full adders are connected by signal lines for transmitting carry signals. An example of a practical circuit forming each of the full adders 51 to 58 is presented, for example in an article by Murakami et al entitled "A Digital Processor for Decoding Composite TV Signals Using Adaptive Filtering" (IEEE, Journal of Solid State Circuits, Vol. SC-21, No. 5, October 1986).

Figure 5:
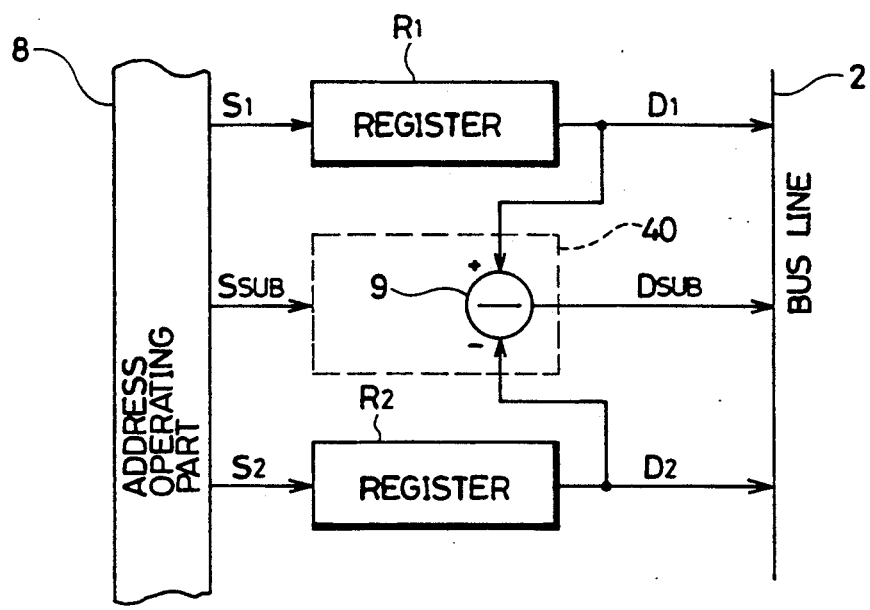
FIGS. 5 to 11 are schematic block diagrams of the register part indicating other embodiments in accordance with the present invention.

FIGS. 5 to 10 are schematic block diagrams of register part 7a each representing other embodiments of the present invention. With reference to FIG. 5, a subtracting circuit 9 is connected to the outputs of registers R1 and R2 as a preceding operation circuit 40. Subtracting circuit 9 is responsive to a source designation signal $S_{SUB}$ output from address operating part 8 to supply data $D_{SUB}$ indicative of the result of the subtraction to bus line 2.

Figure 6:
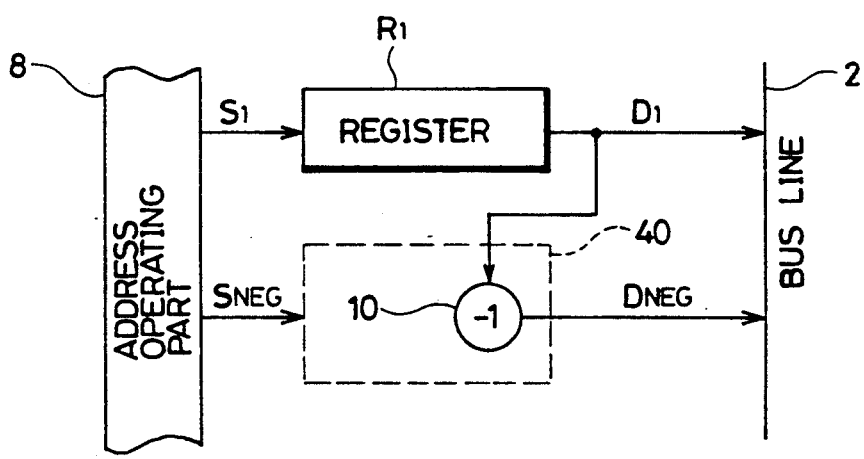

With reference to FIG. 6, a sign inverter 10 is connected to the output of register R1 as a preceding operation circuit 40. Immediately after data, the sign of which is to be inverted, is stored in register R1, the sign inverted data is obtained by sign inverter 10. Preceding operation circuit 40 is responsive to a source designation signal $S_{NEG}$ which requires the sign inverted data to supply the sign inverted data $D_{NEG}$.

Figure 7:
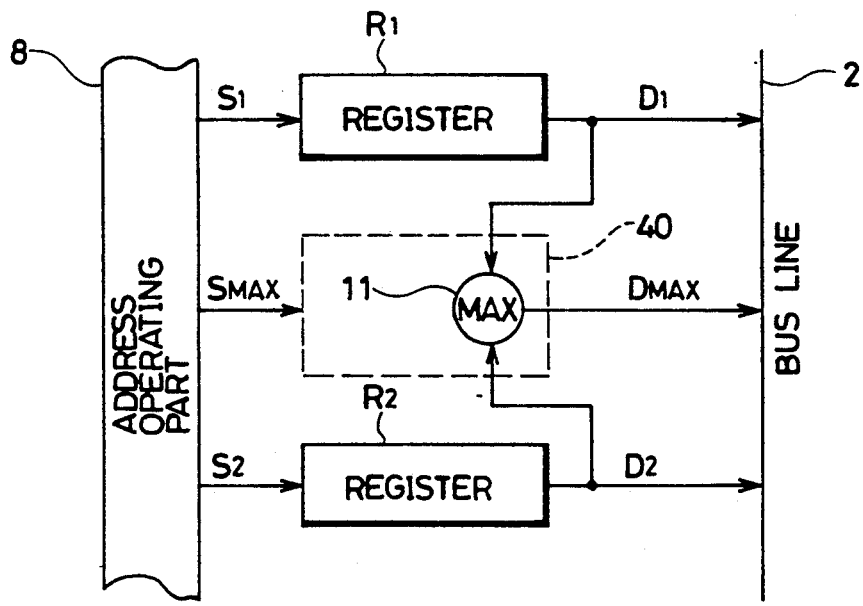

With reference to FIG. 7, a maximum value selection circuit 11 is connected to the outputs of registers R1 and R2 as a preceding operation circuit 40. Maximum value selection circuit 11 compares data D1 and D2 each held in registers R1 and R2, and then selects the larger data. Preceding operation circuit 40 is responsive to a source designation signal $S_{MAX}$ to supply the larger data among the data D1 and D2 as output data $D_{MAX}$ to bus line 2.

Figure 8:
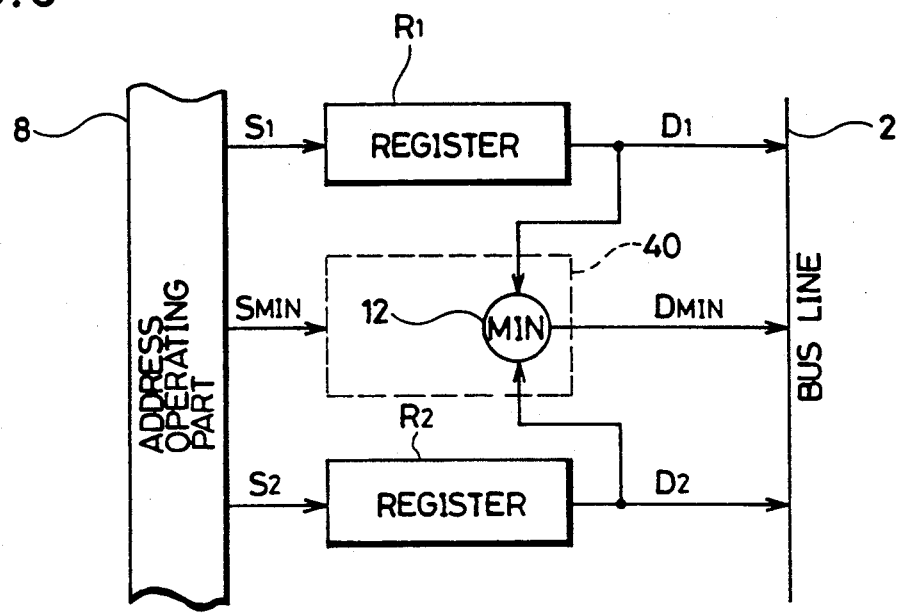

With reference to FIG. 8, a minimum value selection circuit 12 is connected to the outputs of registers R1 and R2 as a preceding operation circuit 40. The smaller data among the data D1 held in register R1 and the data D2 held in register R2 is supplied as output data $D_{MIN}$ to bus line 2.

Figure 9:
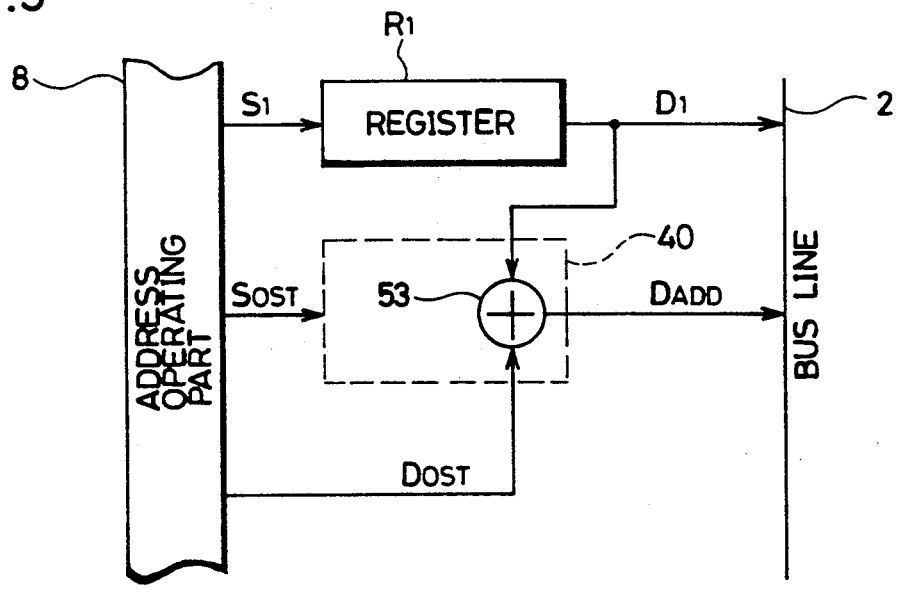

With reference to FIG. 9, an adding circuit 53 is connected to the output of register R1 as a preceding operation circuit 40. Adding circuit 53 has one input connected to receive output data D1 from register R1 and the other input connected to receive immediate data $D_{OST}$ written in the operand part of the instruction from address operating part 8. Adding circuit 53 thus carries out addition of the data D1 and $D_{OST}$, and responds to a source designation signal $S_{OST}$ to supply the added data $D_{ADD}$ to bus line 2. That is, FIG. 9 indicates the case in which preceding operation circuit 40 receives the immediate data $D_{OST}$ from address operating part 8.

Figures 10, 12:
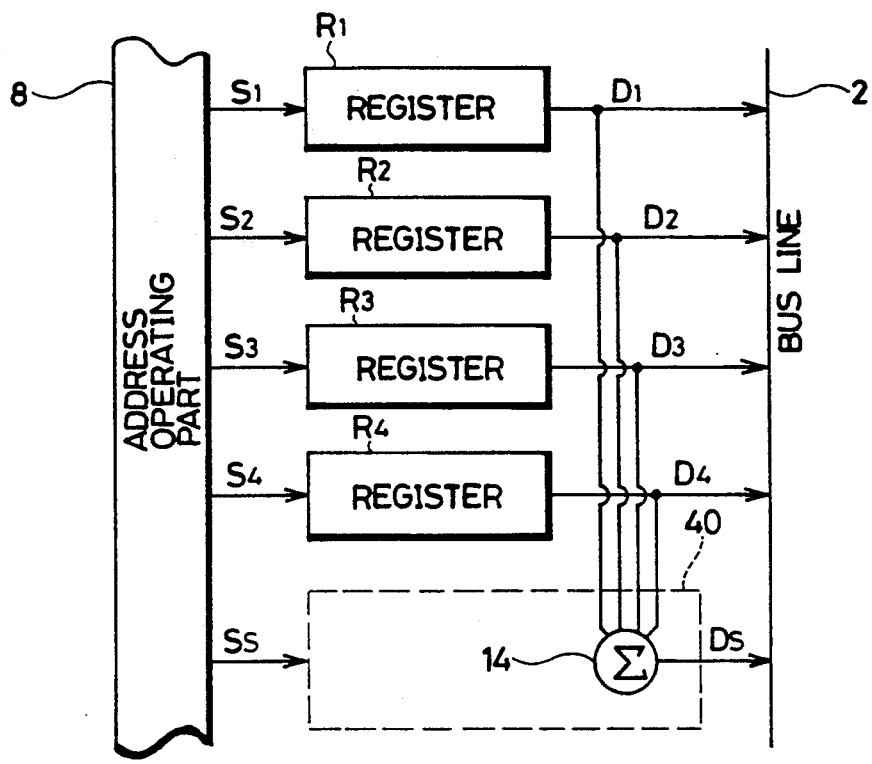
FIG. 12 is an operational flow chart showing the case in which 8 data are added up by the register part indicated in FIG. 11.

With reference to FIG. 10, a summing circuit 14 is connected to the outputs of registers R1 to R4 as a preceding operation circuit 40. Therefore, as represented by the following equation, summing circuit 14 carries out addition of data D1 to D4 held in the respective registers R1 to R4.

$$D_s = D1 + D2 + D + D4 \qquad (8)$$

Preceding operation circuit 40 is responsive to a source designation signal $S_S$ output from address operating part 8 to supply data $D_S$ indicative of the sum of data to bus line 2. Thus, FIG. 10 shows the case in which preceding operation circuit 40 is connected to the outputs of two or more registers.

In each of the embodiments indicated in FIGS. 5 to 10, operation in preceding operation circuit 40 is carried out at the same time when data is stored in a predetermined register. Preceding operation circuit 40 is responsive to a source designation signal requiring the result of the operation to supply data indicative of the result of the operation to bus line 2. The data supplied to bus line 2 is transmitted to data operating part 1 and then used for operation in ALU 3 or multiplier 5. In either embodiment, the part of operations carried out by ALU 3 in a conventional microprocessor is performed simultaneously with the supply of data to registers by preceding operating circuit 40 thereby reducing the time required for the operation.

Accordingly, ALU 3 and multiplier 5 in data operating part 1 receive the result of the operation obtained by supplying data to specified registers as source data. ALU 3 and multiplier 5 further carry out the rest of the necessary operations on the data obtained from preceding operating circuit 40.

In other words, it is pointed that an operation is carried out by preceding operation circuit 40 in parallel separately from ALU 3 and multiplier 5. In addition, the number of instructions required for the operation is reduced compared to a conventional microprocessor, thereby realizing the faster operation.

Figure 11:
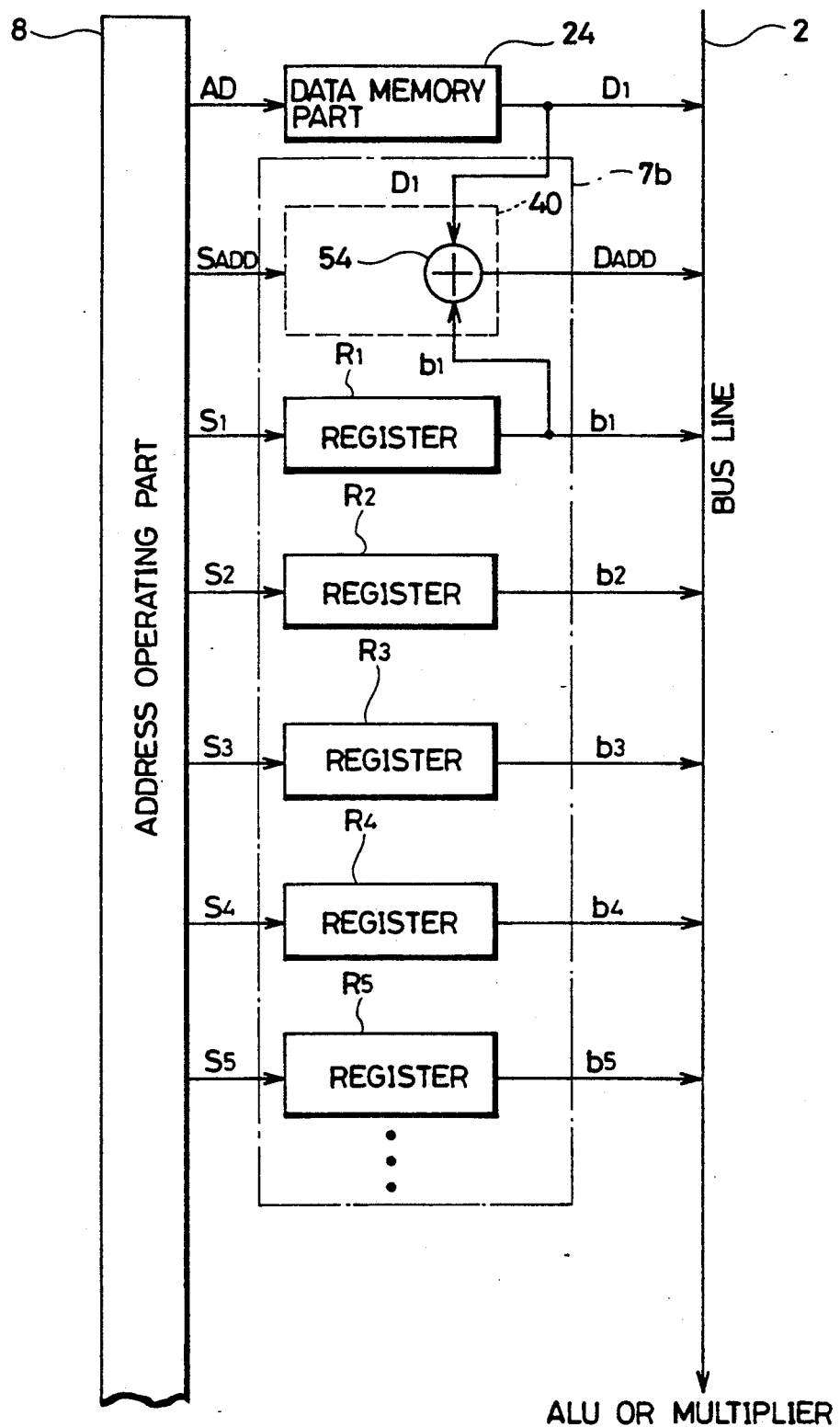

FIG. 11 is a schematic block diagram of register part 7b showing other embodiments of this invention. Register part 7b is employed in a microprocessor in place of register part 4 indicated in FIG. 20. Register part 7b comprises 5 registers R1 to R5 required for carrying out addition of 8 data, which will be described in the following. Register part 7b further comprises an adding circuit 54 connected to the output of data memory part 24 and the output of the register R1. Adding circuit 54 is provided as a preceding operation circuit 40 separately from ALU 3 and multiplier 5 in data operating part 1 indicated in FIG. 20. Address operating part 8 outputs a source designation signal $S_{ADD}$ requiring the result of the addition. Preceding operation circuit 40 is responsive to the signal $S_{ADD}$ to supply data $D_{ADD}$ indicative of the result of the addition to bus line 2. Each of the registers R1 to R5 is connected to receive data representative of the result of the operation from ALU 3 and multiplier 5 indicated in FIG. 20. (not shown).

FIG. 12 is an operational flow chart showing the case in which addition of 8 data is performed using register part 7b indicated in FIG. 11. With reference to FIG. 12, the operation represented by the foregoing equation (7) is carried out. First, in step 1, data a1 stored in address M1 and data a2 stored in address M2 in data memory part 24 are added up by ALU 3, and the added data b1 is held in register R1. The designation of data stored in data memory part 24 is made based on an address signal AD generated from address operating part 8. Likewise, in step 2 data a3 and a4 stored in addresses M3 and M4 in data memory part 24 are added up and the added b2 is held in register R2.

In step 3, data a5 stored in address M5 and data b2 held in register R2 are added up, and the added data b3 is held in register R3. Similarily, in step 4, data a6 in data memory part 24 and data b3 in register R3 are added up, and then the added data b4 is held in register R4. In step 5, data a7 in data memory part 24 and data b4 in register R4 are added up, and the added data b5 is held in register R5.

In step 6, preceding operation circuit 40 starts operating. Data a8 is read out from data memory part 24 and the data read out and the data b1 held in register R1 are added up by adder 54. The added data $D_{ADD}$ is supplied to bus line 2 through ALU 3 and addition of the data $D_{ADD}$ and the data b5 held in register R5 is carried out in ALU 3. All the operations represented by equation (7) is thus completed. Data X indicative of the result of the operation is held in register R5 (step 6).

Compared to the conventional operational flow chart indicated in FIG. 22, it is pointed out that one arithmetic step is omitted in case addition of 8 data is carried out. That is, as addition of 8 data a1 to a8 is carried out over the period corresponding to six instruction cycles, the operation time is reduced thereby realizing faster operational processing accordingly. In other words, the number of instructions required for the operation being reduced, the time required for the operation is reduced.

Figure 13:
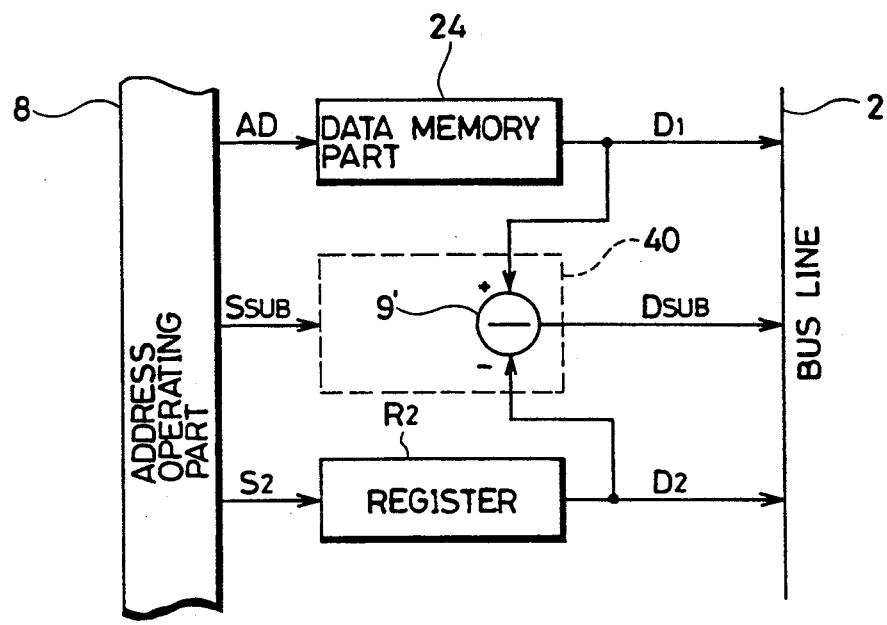
FIGS. 13 to 18 are schematic block diagrams of a register part each showing other embodiments in accordance with the present invention.

FIGS. 13 to 17 are schematic block diagrams each showing another embodiment of this invention. With reference to FIG. 13, a subtracting circuit 9' is connected to the outputs of data memory parts 24 and register R2 as preceding operating circuit 40. Subtracting circuit 9' is responsive to a source designation signal $S_{SUB}$ output from address operating part 8 to supply data $D_{SUB}$ indicative of the result of the subtraction to bus line 2.

Figure 14:
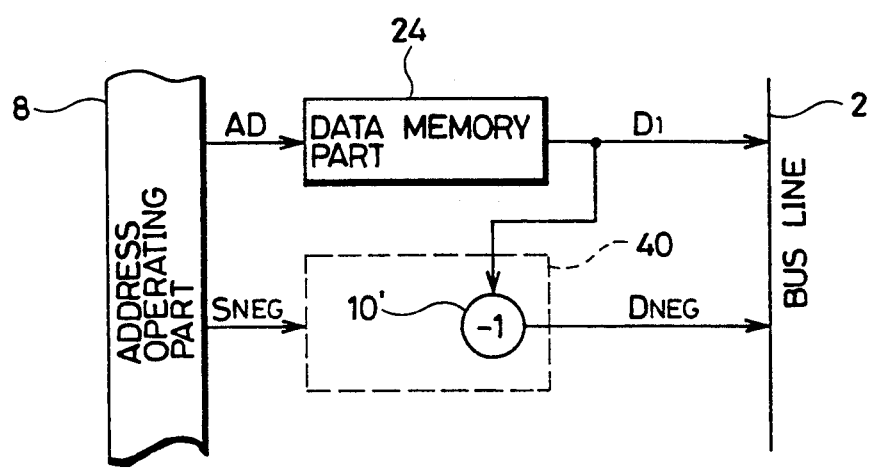

With reference to FIG. 14, a sign inverter 10' is connected to the output of data memory part 24 as preceding operating circuit 40. Each sign inverted data by sign inverter 10' is obtained immediately after the data, the sign of which will be inverted, is read out from data memory part 24. Preceding operation circuit 40 is responsive to a source designation signal $S_{NEG}$ requiring sign inverted data to supply sign inverted data $D_{NEG}$ to bus line 2.

Figure 15:
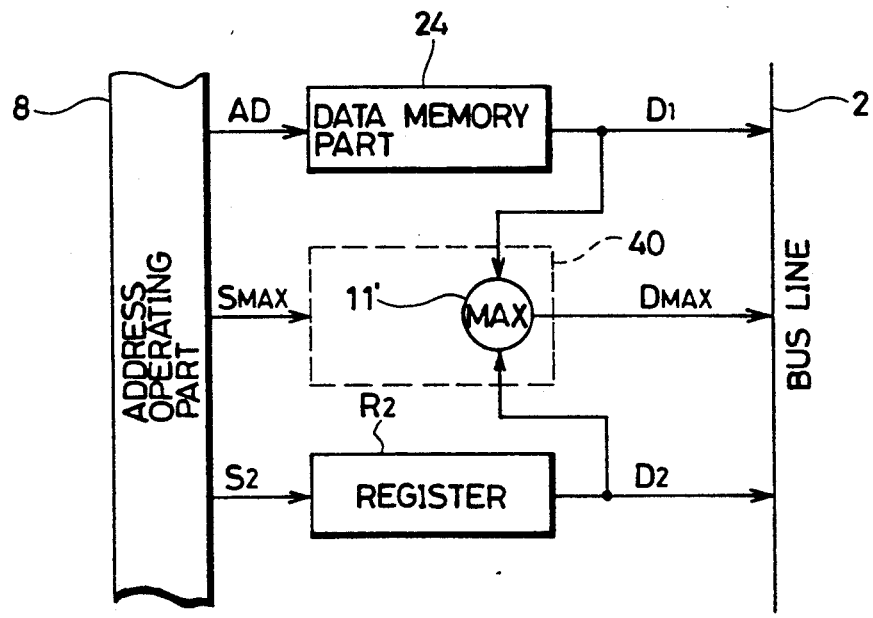

With reference to FIG. 15, a maximum value selection circuit 11' is connected to the outputs of data memory part 24 and register R2 as a preceding operation circuit 40. Maximum value selection circuit 11' compares data D1 read out from data memory part 24 and data D held in register R2 and selects the larger data. Preceding operation circuit 40 is responsive to a source designation signal $S_{MAX}$ to supply the larger data among data D1 and D2 as output data $D_{MAX}$ to bus line 2.

Figure 16:
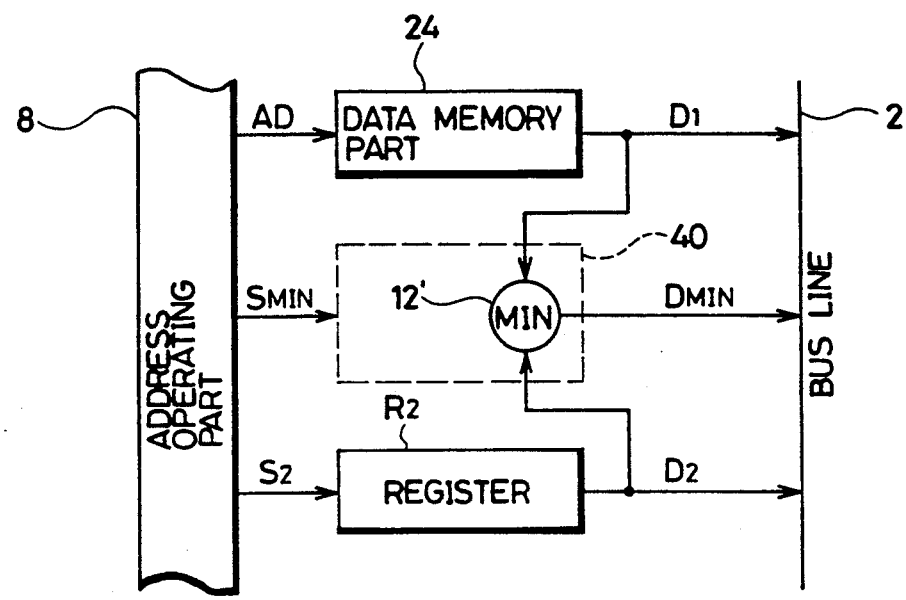

With reference to FIG. 16, a minimum value selection circuit 12' is connected to the outputs of data memory part 24 and register R2 as a preceding operation circuit 40. Comparison is conducted between data D1 read out from data memory part 24 and data D2 held in register R2, and the smaller data is supplied to bus line as output data $D_{MIN}$.

Figure 17:
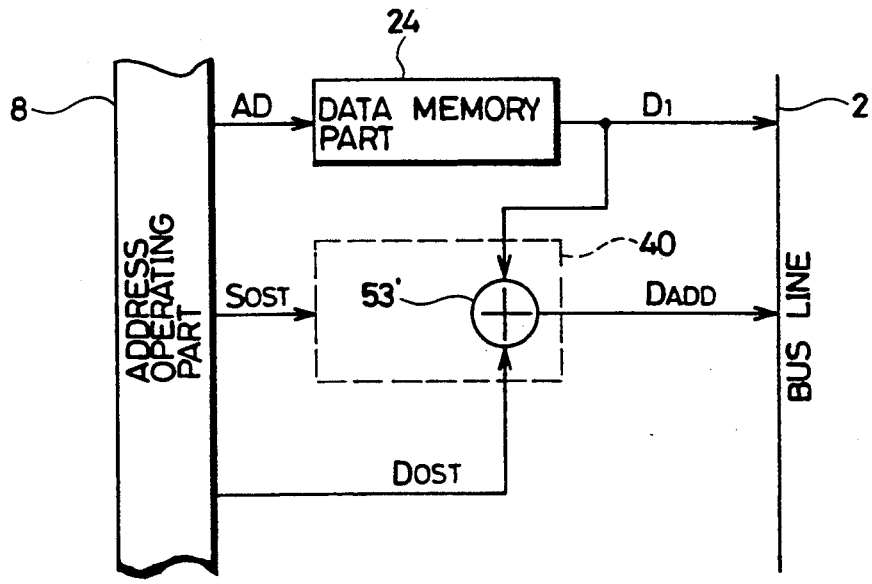

With reference to FIG. 17, an adding circuit 53' is connected to the output of data memory part 24 as a preceding operation circuit 40. Adding circuit 53' has one input connected to receive data D1 read out from data memory part 24. The other input of adding circuit 53' is connected to receive immediate data $D_{OST}$ written in the operand part of an instruction. Accordingly, adding circuit 53' carries out addition of data D1 and $D_{OST}$, and responds to a source designation signal $S_{OST}$ to supply the added data $D_{ADD}$ to bus line 2.

In any of the embodiments shown in FIG. 13 to 17, the operation by preceding operation circuit 40 is carried out at the same time when data used for the operation is read out from data memory part 24. Preceding operation circuit 40 is responsive to the source designation signal which requires the result of the operation to supply data indicative of the result of the operation to bus line 2. The data supplied to bus line 2 is transmitted to data operating part 1 and used for the operations in ALU 3 or multiplier 5. In each of the embodiments, a part of the operations carried out by ALU 3 in a conventional microprocessor, is performed by preceding operation circuit 40 at the same time data is read out from data memory part 24 thereby reducing the time required for the operation.

Figure 18:
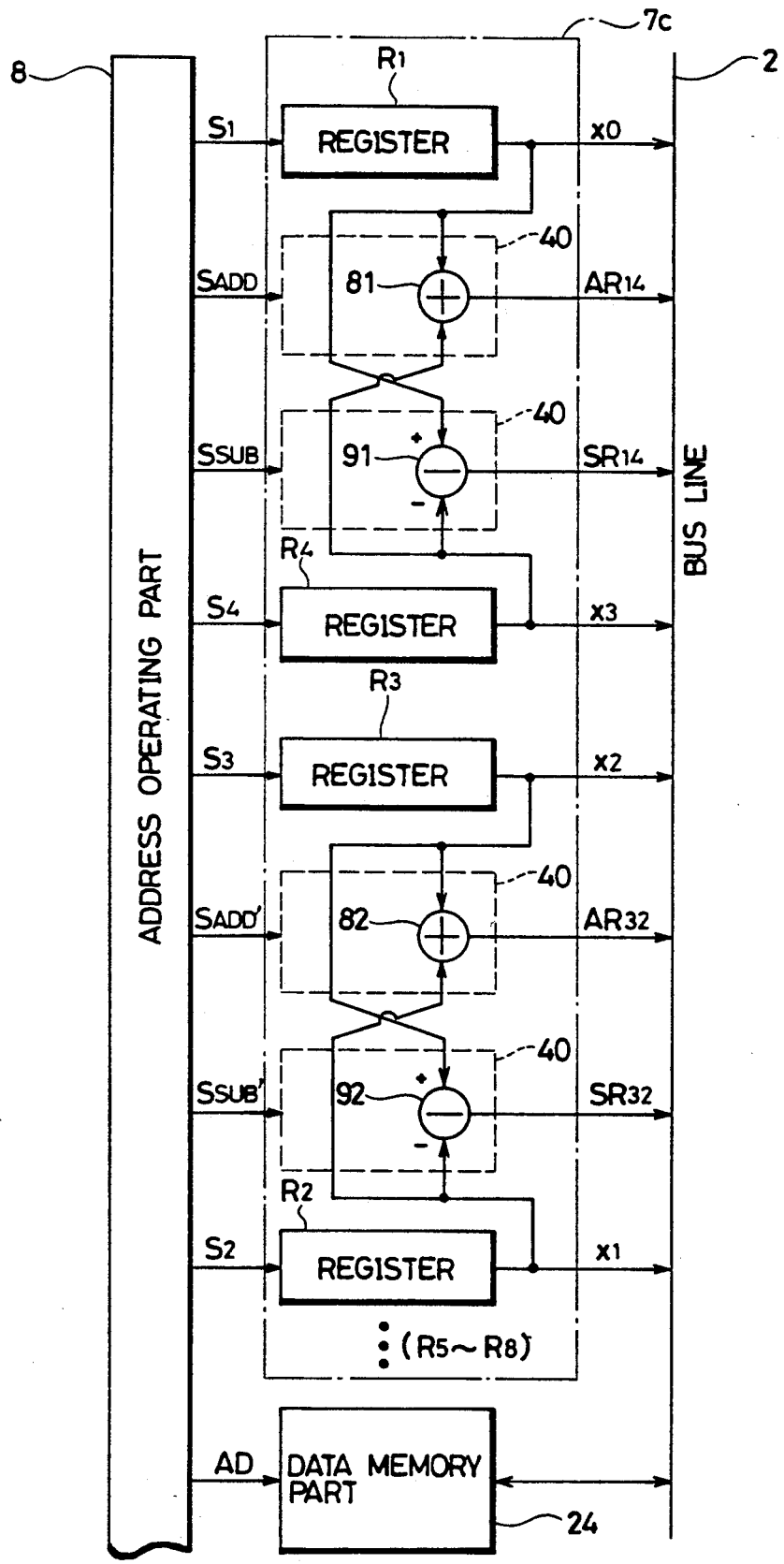

FIG. 18 is a schematic block diagram of register part 7c showing another embodiment of this invention. Register part 7c shown in FIG. 18 is employed in a microprocessor in place of register part 4 shown in FIG. 20. Register part 7c comprises 8 registers R1 to R8 and 4 preceding operation circuits 40 required for carrying out butterfly operation, which will be described later. Each of the preceding operation circuits 40 comprises either adding circuits 81 and 82 or subtracting circuits 91 and 92. Adding circuit 81 is connected to the respective outputs of registers R1 and R4 and responds to a source designation signal $S_{ADD}$ output from address operating part 8 to apply data AR14 indicative of the result of the addition to bus line 2. Meanwhile, subtracting circuit 91 is connected to the respective outputs of registers R1 and R4 and responds to a source designation signal $S_{SUB}$ output from address operating part 8 to apply data SR14 indicative of the result of the subtraction to bus line 2. Likewise, adding circuit 82 and subtracting circuit 92 are connected to the outputs of registers R2 and R3 and apply output data AR32 and SR32 to bus line 2, respectively. Each of registers R1 to R8 is connected to receive data indicative of the results of the operations from ALU 3 and multiplier 5 indicted in FIG. 20. (not shown).

Figures 23, 24:
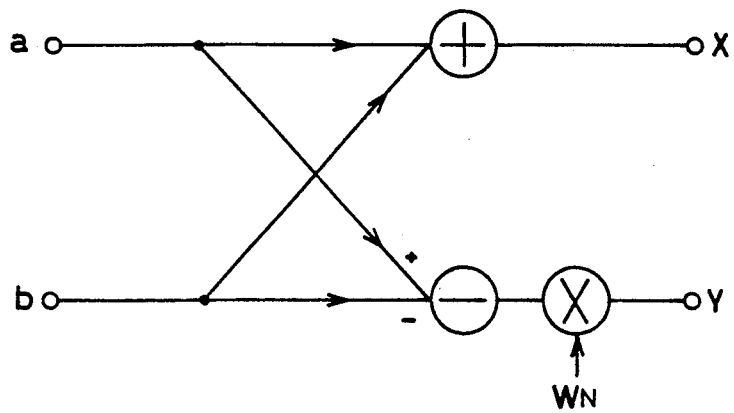
FIG. 23 is a diagram showing operational signs for butterfly operation.
FIG. 24 is an operational flow chart showing the case in which butterfly operation is carried out by the register part indicated in FIG. 21.

FIG. 19 is an operational flow chart showing the case in which butterfly operation is carried out using register part 7c indicated in FIG. 18. With reference to FIG. 19, description will be given on operational processing for butterfly operation in the following. For reference, as is the case shown in FIG. 24, the respective input data X0 to X3 are supposed to be held in each of the registers R1 to R4 in advance. Therefore, output data AR14, AR32, SR14 and SR32 output from each of the preceding operation circuits will be described as follows.

$$AR14 = x0 + x3 \qquad (9)$$

$$AR32 = x2 + x1 \qquad (10)$$

$$AR14 = x0 - x3 \qquad (11)$$

$$AR32 = x2 - x1 \qquad (12)$$

First, in step 1, as address operating part 8 outputs the source designation signals $S_{ADD}$ and $S_{ADD'}$, the added data AR14 and AR32 are applied to bus line 2 from adding circuits 81 and 82. Data AR14 and AR32 are applied to ALU 3 through bus line 2, and data a3 indicative of the result of the addition is stored in register R5 (not shown). Likewise, in step 2, the output data AR14 and AR32 are transmitted to ALU 3, and data a4 indicative of the result of the subtraction is stored in a register R7 (not shown).

In steps 3 and 4, multiplication is carried out on the data a3 and a4 each held in the respective registers R5 and R7, and data z0 and z2 indicative of the result of the multiplication is stored in each of the registers R5 and R7.

In steps 5 and 6, each of the subtracting circuits 91 and 92 are responsive to the source designation signals $S_{SUB}$ and $S_{SUB'}$ output from address operating part 8 to apply the output data SR14 and SR32 to bus line through multiplier 5. In multiplier 5, multiplication is carried out on the data SR14 and SR32, respectively, and data a7 and a8 representative of the result of the multiplication are each stored in registers R6 and R8 (not shown). In step 7, subtraction is done on data a7 held in register R6 and the data a8 held in register R8, and the data z1 indicative of the result of the subtraction is stored in register R6.

In steps 8 and 9, source designation signals $S_{SUB}$ and $S_{SUB'}$ are once again output from address operating part 8, and multiplication is carried on the output data SR14 and SR32 in multiplier 5. Data a9 and a10 indicative of the result of the multiplication is stored in registers R3 and R4. In step 10, the data a9 and a10 held in registers R3 and R4 respectively are added up in ALU 3, and data z3 indicative of the result of the addition is stored in register R8.

As a result of the above mentioned operational processing, the respective data z0 to z3 indicative of the result of butterfly operation are obtained in registers R5 to R8, respectively. Compared to the conventional operational flow chart shown in FIG. 24, it is pointed out that by providing preceding operation circuit 40, 4 operational steps are reduced. That is, in case conventional register part 4 indicated in FIG. 21 is used for butterfly operation, 14 operational steps are required altogether, while in case register part 7c indicated in FIG. 18 is used, 10 operational steps are sufficient. The number of instructions is reduced because it is not necessary to carry out the reduced 4 operational steps by ALU 3. In addition, the operation is carried out by preceding operating circuit 40 at the same time each of the data x0 to x3 is applied to the respective registers R1 to R4, thereby realizing faster operation processing. In other words, as the number of instructions required for the operation is reduced, the time required for the operation is reduced. Generally, as found in the foregoing article by Chen et al, in most fast algorithms, butterfly operation is repeated many times. Therefore, reduction in the operational steps tremendously contributes to the realization of faster operational processing.

In order to provide the preceding operating circuit 40 indicated in the above mentioned embodiment, it is sufficient to provide preceding operation circuit 40 such as an adding circuit and a subtracting circuit with a simple circuit configuration. The source designation signal for designating preceding operating circuit 40 is generated in accordance with an instruction program stored in an instruction memory part 23. This means that it is not necessary to add a complicated control circuit. It is pointed out that changes in the circuit for providing preceding operation circuits 40 are remarkably few and the above mentioned embodiment can be readily implemented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor comprising:
   control signal generation means for generating a control signal,
   first operating means responsive to the control signal for carrying out a first operation designated by the control signal, data bus lines connected to said first operating means for transmitting data used for the first operation by said first operating means, holding means connected to said data bus lines for holding data used for the first operation by said first operating means and responsive to said control signal to supply said data to said data bus lines, and second operating means continuously receiving an output of said holding means for carrying out a predetermined second operation in response to storage of said data in said holding means, said second operating means being responsive to the control signal to supply data indicative of the result of the second operation to said data bus lines.

2. The processor according to claim 1, wherein said first operating means being further responsive to said control signal for carrying out said predetermined second operation, and said second operating means is responsive to the control signal to perform said second operation and to supply data indicative of the result of the second operation to said first operating means through said data bus lines, thereby to reduce time required by said first means to carry out said second operation.

3. The processor according to claim 1, wherein said holding means comprises storage means connected to said data bus lines for storing data used for the first operation by said first operating means, and said storage means is responsive to the control signal for applying the stored data to said second operating means.

4. The processor according to claim 1, wherein said holding means comprises first and second registers for holding data used for the first operation by said first operating means said first and second registers being connected to said data bus lines.

5. The processor according to claim 4, wherein said second operating means comprises adding means connected to outputs of said first and second registers for carrying out a predetermined addition operation.

6. The processor according to claim 4, wherein said second operating means comprises subtracting means connected to outputs of said first and second registers for carrying out a predetermined subtraction operation.

7. The processor according to claim 4, wherein said second operating means comprises comparison means connected to outputs of said first and second registers for carrying out a predetermined comparison operation.

8. The processor according to claim 1, wherein said holding means comprises a single register connected to said data bus lines for holding data used in said second operating means.

9. A processor comprising:

control signal generation means for generating a control signal to control the designation and execution of a first operation, first operating means responsive to the control signal for carrying out the first operation designated by the control signal, data bus lines connected to said first operating means for transmitting data used for the first operation by said first operating means, holding means connected to said data bus lines for holding data used for the first operation by said first operating means, and second operating means connected to an output of said holding means for carrying out a predetermined second operation, said holding means comprising a single register connected to said data bus lines for holding data used in said second operating means, said second operating means being responsive to the control signal to supply data indicative of the result of the second operation to said data bus lines, wherein said second operating means comprises sign inverter means connected to the output of said single register for inverting the sign of output data from said single register.

10. The processor according to claim 1, wherein said control signal generation means further generates data used by said second operating means, and said second operating means receives data held in said holding means and data generated from said control signal generation means, and carries out said predetermined second operation.

11. The processor according to claim 1, wherein said holding means comprises n registers each connected to said data bus lines for holding n data applied through said data bus lines and used for the second operation in said second operating means, said n comprising an integer above two, said second operating means comprising summing means connected to each of said n registers for summing output data from said n registers.

12. The processor according to claim 1, wherein said first operating means comprises one of an arithmetic and logic unit and a multiplier connected to said data bus lines.

13. The processor according to claim 1, wherein said control signal generation means comprises:

program storage means for storing a program and having an output for outputting the program to instruct execution of said first operation, and decoding means connected to said program storage means for decoding the program output from said program storage means and outputting a signal obtained by decoding as said control signal.

14. A processor comprising;

control signal generation means for generating a control signal to control the designation and execution of a desired first operation, first operating means responsive to the control signal for carrying out the first operation designated by the control signal, data bus lines connected to said first operating means for transmitting data used for the first operation by said first operating means, holding means connected to said data bus lines for holding first data used for the first operation by said first operating means and responsive to said control signal to supply said data to said data bus lines, data storage means connected to said data bus lines for storing second data used for the first operation by said first operating means, and second operating means continuously receiving an output of said holding means and an output of said data storage means for carrying out a predetermined second operation in responsive to storage of said data in said holding means, said second operating means being responsive to the control signal to supply data indicative of the result of the second operation to said data bus lines.

15. A processor comprising:
data bus lines for transmitting operational data,
operating means connected to said data bus lines for operating on the operational data applied from said data bus lines,
at least first and second holding means connected to receive output data from said operating means for holding the output data,
adding means continuously receiving outputs of said first and second holding means for adding the data held in said first and second holding means, and
subtracting means continuously receiving outputs of said first and second holding means for subtracting the data held in said first and second holding means, said adding means and subtracting means having outputs connected to said data bus lines.

16. The processor according to claim 15, wherein said operating means comprises multiplying means connected to receive output data from said subtracting means for multiplying the output data from said subtracting means by a value defined in accordance with a predetermined operational formula.

17. The processor according to claim 15, wherein each of said first and second holding means comprises first and second registers, respectively.

18. The processor according to claim 16, wherein said predetermined operational formula comprises butterfly operational formula, and
said processor further comprises control signal generating means for generating a control signal to carry out butterfly operation,
said adding means, subtracting means and multiplying means being responsive to the control signal to carry out each of the operations.

19. A processor according to claim 18, wherein said control signal generating means comprises;
storage means for storing an instruction program to carry out said butterfly operation, and
decoding means for decoding the instruction program from said storage means and for outputting said control signal.

20. The processor according to claim 19, wherein said control signal generating means further comprises designation signal generating means responsive to the output signal from said decoding means for generating a source designation signal to designate said adding means and subtracting means as sources by an operation performed by said operating means.

21. The processor according to claim 15, comprising a digital signal processor (DSP).

22. The processor according to claim 1, wherein said first operating means is connected for receiving said data indicative of the result of the second operation from said second operating means through said data bus lines.

23. In a digital signal processor including an instruction storage means, a program sequence control means responsive to instructions from said instruction storage means for generating control signals, data storage means, address means for addressing data in said data storage means and for generating source and destination addresses for operands and for results of mathematical operations on said operands, data operating means including multiplying means and ALU (arithmetic logic unit) means for performing mathematical operations on data supplied thereto, a plurality of register means for storage of intermediate results of said mathematical operations, and bus means for transfer of signals and data among the plurality of means of said digital signal processor, the improvement comprising:
step reducing means for reducing a number of mathematical steps performed by said ALU means in obtaining a result of a predetermined mathematical operation, said step reducing means comprising:
preceding operation means for performing a processing step on the intermediate result stored in said register means preliminary to provision of the intermediate result to said ALU means, thereby eliminating a requirement of said ALU means to perform said processing step and saving processing time required of said ALU means to execute said predetermined mathematical operation,
said preceding operation means having input means continuously connected to at least one of said register means for continuously receiving said intermediate result therefrom,
said preceding operation means initiating performance of said processing step substantially simultaneously with storage of said intermediate result in said register means connected to said input means thereof and responsive to control signals from said address means for transferring a result of said processing step performed thereby to said bus line for provision to said ALU means.

24. An improved digital signal processor as recited in claim 23, wherein said preceding operation means is connected to only one of said register means for performing a sign inversion on the intermediate result stored therein.

25. An improved digital signal processor as recited in claim 23, wherein said preceding operation means is connected to at least three of said register means for obtaining a sum of the intermediate results stored therein.

26. An improved digital signal processor as recited in claim 23 wherein said input means of said preceding operation means is further connected to receive immediate data written in an operand part of an instruction from said address means for performing said processing step on said intermediate result stored in said register means and on said immediate data from said instruction.

27. An improved digital signal processor as recited in claim 23 wherein said input means of said preceding operation means is further connected to said data storage means for receiving data stored therein to perform said processing step on intermediate data from said register means and on data from said data storage means.

28. An improved digital signal processor as recited in claim 23 comprising a plurality of preceding operation means, said plurality of preceding operation means connected in pairs for performing processing steps in a butterfly operation, each pair connected to a respective pair of register means for performing said processing steps on intermediate results respectively stored therein.

29. An improved digital signal processor as recited in claim 28 wherein each pair of preceding operation means includes a first preceding operation means for performing an addition and a second preceding operation means for performing a subtraction.

* * * * *